United States Patent [19]
Kindt

[11] Patent Number: 4,955,086
[45] Date of Patent: Sep. 4, 1990

[54] REFLECTION TRANSMITTER AND RECEIVER MEANS FOR A BIDIRECTIONAL LIGHT WAVEGUIDE COMMUNICATIONS SYSTEM

[75] Inventor: Stefan Kindt, Munich, Fed. Rep. of Germany

[73] Assignee: Siemens Aktiengesellschaft, Berlin and Munich, Fed. Rep. of Germany

[21] Appl. No.: 284,728

[22] Filed: Dec. 15, 1988

[30] Foreign Application Priority Data

Dec. 15, 1987 [DE] Fed. Rep. of Germany ....... 3742504

[51] Int. Cl.$^5$ .............................................. H04B 10/24
[52] U.S. Cl. ..................................... 455/605; 455/612
[58] Field of Search ............... 455/600, 606, 605, 604, 455/607, 617, 612

[56] References Cited

U.S. PATENT DOCUMENTS

| | | | |
|---|---|---|---|
| 4,195,269 | 3/1980 | Ettenberg et al. | 332/7.51 |
| 4,198,115 | 4/1980 | Kaminow | 350/96.14 |
| 4,436,365 | 3/1984 | Hodgins | 455/612 |
| 4,596,466 | 6/1986 | Ulrich et al. | 356/345 |
| 4,775,971 | 10/1988 | Bergmann | 370/3 |

FOREIGN PATENT DOCUMENTS

| | | |
|---|---|---|
| 2708606 | 8/1978 | Fed. Rep. of Germany . |
| 3044183 | 6/1982 | Fed. Rep. of Germany . |
| 0240475 | 10/1986 | German Democratic Rep. ..................................... 455/600 |
| WO 87/06084 | 10/1987 | World Int. Prop. O. . |

OTHER PUBLICATIONS

"Two-way Transmission Using Electro-Optical Modulator", Wheeler et al., Electronics Letters, 24 Apr. 1986, vol. 22, No. 9, pp. 479-481.

"Bidirectional Fibre-Optic Link Using Reflective Modulation", Duthie et al., Electronics Letters, 8 May 1986, vol. 22, No. 10, pp. 517-518.

"Entwicklungstendenzen der Integrierten Optik", Auracher et al., telcom report, vol. 10, No. 2, 1987 pp. 90-98.

"Reflection Mode Integrated Optical Fabry-Perot Modulator" Bruland et al., Proceedings of the Fourth European Conference on Integrated Optics ECIO, Glasgow, Scotland, May 11-13, 1987, pp. 44-47.

"Design Considerations and Analysis of Velocity Mismatch Effects in an Electrooptic Fabry-Perot Modulator", Stallard et al., Optics Communications, 1, Oct. 1985, vol. 55, No. 5, pp. 316-318.

Primary Examiner—Joseph A. Orsino
Assistant Examiner—L. Van Beek
Attorney, Agent, or Firm—Hill, Van Santen, Steadman & Simpson

[57] ABSTRACT

A bidirectional light waveguide communications system comprising a light waveguide and a light source, preferably formed by a laser, at one end of a light waveguide, and having a reflection transmitter at the other end. The reflection transmitter is formed by an electrically controllable integrated optical Fabry-Perot resonator whose strip electrode is terminated by two partially reflecting mirror layers and whose control electrodes are charged with a transmission signal. The optoelectrical transducer of the subscriber is positioned adjacent one of the partially reflecting mirrored layers, while the other partially reflecting mirrored layer is connected to the light waveguide.

4 Claims, 1 Drawing Sheet

REFLECTION TRANSMITTER AND RECEIVER MEANS FOR A BIDIRECTIONAL LIGHT WAVEGUIDE COMMUNICATIONS SYSTEM

BACKGROUND OF THE INVENTION

The present invention is directed to a bidirectional communications system formed with a monomode light waveguide, wherein it is possible to provide a light source or light sources at only one end of the light waveguide link and to provide a reflecting means with an optical modulator at the other end of the light waveguide link.

Bidirectional communications systems formed with a monomode light waveguide, which has one end connected to a light source or a plurality of light sources and the other end connected to a reflecting means which is actuated by an optical modulator, are disclosed, for example, in U.S. Pat. No. 4,195,269, whose disclosure is incorporated by reference; U.S. Pat. No. 4,775,971, which was the basis for WO-A-No. 87/06084, and whose disclosure is incorporated by reference. In addition to the above two examples, such a system is disclosed in German OS No. 27 08 606 and an article by Wheeler et al, entitled "Two-Way Transmission Using Electro-Optical Modulator", *Electronics Letters*, 24 Apr. 1986, Vol. 22, No. 9, pp. 479–481 and an article by Duthie et al, entitled "Bidirectional Fibre-Optic Link Using Reflective Modulation", *Electronics Letters*, 8 May 1986, Vol. 22, No. 10, pp. 517–518.

An optical (intensity) modulator can be fashioned with a controllable optical directional coupler, as illustrated in FIG. 3 of the above-mentioned U.S. Pat. No. 4,775,971, and as disclosed in FIGS. 8 and 9 of an article by F. Auracher et al entitled "Entwicklungstendenzen der Integrierten Optik", *telecom report*, Vol. 10, No. 2, 1987, pp. 90–98.

Such an optical directional coupler comprises two identical optical strip waveguides, which are narrow, thin strips produced by a diffusion of, for example, titanium into a substrate of lithium niobate. These strips have a higher optical refractive index than the refractive index of the substrate. These two optical strip waveguides are conducted in close proximity to one another, approximately a distance of 5 $\mu$m over a defined length so that optical fields of waves guided in the strip waveguide overlap and thus periodically repeated with what is referred to as the coupling length, light energy is coupled from, respectively, one strip waveguide into the other strip waveguide. Electrodes are provided between and next to the strip waveguides and external electrical fields generated between these electrodes lead to changes in the refractive index due to what is called an electro-optical effect and, thus, change the propagation speed and the amount of scatter with the result that a corresponding change in the coupling of the light energy between the two waveguides will occur.

For a bidirectional light waveguide communications system comprising a light source or light sources at only one end of the light waveguide link, the object of the invention is to, then, disclose a way to achieve an especially expedient design of a reflection transmission and reception means at the other end of the waveguide link.

In this context for a bidirectional light waveguide communications system comprising a light source or light sources, preferably formed by a laser or plurality of laser at only one end of the light waveguide, a reflection transmission means has already been disclosed that is formed by a halved, controllable optical direction coupler. The coupler has one of its input/output connected to the light waveguide and the two strip waveguides are terminated with a partially reflecting mirror. The coupler has control electrodes which are charged with a transmission signal, and an opto-electric transducer charged with the reception of the light signal by both strip waveguides can be produced following the partially reflecting mirror. This arrangement is disclosed in copending U.S. patent application Ser. No. 226,882, filed Aug. 1, 1988, which claims priority from German Patent Application No. 37 25 479.0.

SUMMARY OF THE INVENTION

The object of the present invention is to provide another way of achieving an especially expedient construction for a reflection transmitter and receiving means for a bidirectional light waveguide communications system.

To accomplish these goals the present invention is directed to an improvement in a reflection transmitter and receiving means for a bidirectional light waveguide communications system comprising a light source or light sources, preferably formed by a laser or lasers at only one end of the light waveguide. The improvement is that the reflection transmitter and receiver means includes an opto-electric transducer and an electrically controllable integrated-optical Fabry-Perot resonator, which has a first partially reflecting mirror connected to the light waveguide and a second partially reflecting mirror positioned adjacent the opto-electric transducer, and whose control electrodes are charged with the transmission signal so that the resonator can be switched between a reflecting mode and a transmitting mode.

Let it be noted that it is known to employ Fabry-Perot resonators or respective Fabry-Perot interferometers for length measurement. These arrangements comprise two reflector members or mirrors to extend parallel to one another between which light is reflected back and forth in a resonant fashion. If at least one of the two mirrors can be partially reflecting so that the light can pass therethrough and at least one of the two mirrors is fashioned mobile and the reflecting spacing is linked to the length or, respectively, the length change to be measured so that the light transmission is then periodically dependent on the reflector spacing. Such an arrangement is disclosed in U.S. Pat. No. 4,596,466, which claims priority from German Application No. 30 44 183.

It is also noted that it is fundamentally known to fashion an electro-optic Fabry-Perot modulator as a reflection modulator, as disclosed in an article by Bruland et al entitled "Reflection Mode Integrated Optical Fabry-Perot Modulator", *Proceedings of the Fourth European Conference on Integrated Optics, ECIO 1987*, Glasgow, Scotland, May 11–13, 1987, pp. 44–47 and an article by Stallard et al entitled "Design Considerations and Analysis of Velocity Mismatch Effects in an Electrooptic Fabry-Perot Modulator", *Optics Communications*, Vol. 55, No. 5, 1 Oct. 1985, pp. 316–318. However, problems with bidirectional communication are not touched or discussed in either of these two references.

In addition to the advantage of a simple structure of the reflection transmitter, the integrated optical assembly is composed only of a linear waveguide section and two polished and coated end faces. The invention yields the further advantage that no high demands are made on the photolithography in the manufacture of the resonator and that the space requirement and material requirement are low. The integrated optical phase modulators, such as shown in FIG. 6 of the article by Auracher et al mentioned above, can be largely utilized in terms of manufacturing technology so that the anti-reflection coating on the end faces is then replaced by a reflective layer. One can, thus, anticipate an extremely cost beneficial manufacture of the reflection transmitter of the invention. It is also advantageous that control voltages of up to 3 V are adequate for switching the reflection transmitter from its condition of maximum reflection into its condition of maximum transmission for TE waves. Even when a thermic stabilization of the operating point by a Peltier element is provided in addition to an electrical stabilization of the operating points, only slight currents are required overall, since no noteworthy electrical dissipated power occurs in the reflection transmission of the invention.

Other advantages and features of the present invention will be readily seen from the following description of the preferred embodiment, the drawings and claims.

DESCRIPTION OF THE PREFERRED EMBODIMENTS

A bidirectional communications system in accordance with the present invention has a light waveguide LWL which, at one end, is connected to an electro-optical transducer, such as a laser diode, and a receiver which comprises an opto-electrical transducer, for example a pin-diode, through a beam splitter T. The other end is connected to a reflection transmitter, which is formed by an integrated optical Fabry-Perot resonator FPR that can be modulated by transmission signals to be transmitted to the one end of the bidirectional light waveguide communications system. Thus, the second end of the system does not have any separate light sources as a transmitter, but utilizes this means for controlling reflection for reflecting back a signal in the opposite direction.

Figure 1:
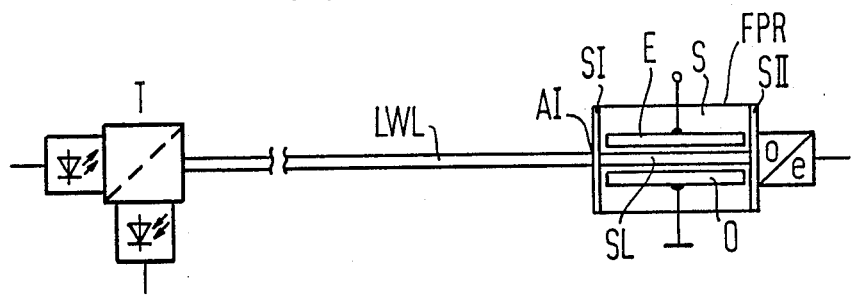
FIG. 1 is a schematic illustration of a bidirectional light waveguide communications system utilizing the reflection transmitter and receiver of the present invention.
Figure 2:
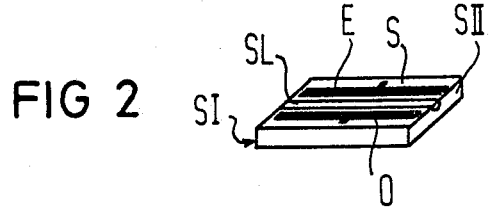
FIG. 2 is a perspective view of the electrically controllable integrated optical Fabry-Perot resonator of the present invention.

The electrically-controllable integrated optical Fabry-Perot resonator FPR, as illustrated in FIG. 2, comprises a substrate S, for example lithium niobate, that has a linear, optical monomode strip waveguide SL diffused therein. The end faces of the LiNbO$_3$ crystal are brought to an optical quality by polishing perpendicular to the waveguide and are provided with partially reflecting, dielectric mirroring layers SI and SII. Together, the optical waveguide SL and the mirrored end faces SI and SII form an optical resonator. The one partially reflecting layer SI forms an input/output A1 by which the integrated optical resonator FPR is connected to the light waveguide LWL. An opto-electric transducer o/e, which, for example, can be a pin-diode of a receiver, whose detailed description is not shown or discussed, is attached to the other partially reflecting surface SII. Control electrodes E and O of, for example, aluminium are vapor-deposited parallel to the linear optical waveguide SL. By applying electrical voltage to these electrodes, it is possible to modify the refractive index of the LiNbO$_3$ crystal and, thus, the optical path length between the two end faces SI and SII of the resonator FPR with the electro-optical effect. These electrodes E and O are charged with a transmission signal, for example with 140-Mbit/s signal that is to be transmitted by the light waveguide LWL.

One part of the incident optical wave is reflected at every end face SI and SII, dependent on the reflection coefficient of the vapor-deposited layer for the Fabry-Perot resonator or, respectively, Fabry-Perot interferometer FPR and the rest is transmitted. The amplitude of the directly transmitted wave trains thereby superimpose following the end faces SI and SII with the amplitude of those wave trains that had been previously reflected back and forth once or repeatedly in the resonator. Dependent on the relative phase relationship, either a mutual cancelling and destructive interference will occur or an additional or constructive interference of the superimposing wave trains will occur.

When, for example, the optical path length between the mirror end faces SI and SII exactly corresponds to an even number multiple of quarter wavelengths of the light employed, then the light transmitted in a forward direction from the light waveguide LWL to the optical electric transducer o/e experiences a constructive interference with the result that no light is reflected back to the light waveguide LWL. In an ideal case of a loss-free resonator, which has no propagation losses in the waveguide, no diffusion losses in the mirrors, the entire light is transmitted in this case.

When the optical wavelength between the mirror layers SI and SII exactly corresponds to an odd numbered multiple of the quarter wavelength, then cancelling occurs in the forward direction and constructive interference occurs for the return direction back to the light waveguide LWL so that a maximum of the light proceeds back to the light waveguide LWL.

The reflection transmitter outlined in the drawings then operates in the following way: a light signal, for example a 680-Mbit/s light signal, is transmitted from the cooperating side of the light waveguide communications system via the monomode light waveguide LWL and, preferably, has a low degree of modulation, for example 10%. This light enters into the strip waveguide SL at the input/output A1 and has an intensity corresponding to the transmissivity of the end face SI and that part of the reception light waveguide in the strip waveguide SL that corresponds to the transmissivity of the partially reflecting surface SII, for example, about 40%, passes through the partially reflecting mirror SII and proceeds to the electro-optical transducer o/e lying therebehind. That part of the light guided in the strip waveguide SL that did not proceed to the opto-electric transducer o/e and that corresponds to the reflectivity of the partially reflecting mirror SII of about 40% in this example is reflected at the partially reflecting mirror SII and proceeds back to the partially reflecting mirror SI to be, in turn, partially transmitted and partially reflected. The event is repeated in a corresponding fashion for the light reflected in this way.

The interference between the light wave trains transmitted by the mirror SI, dependent on transmission signal voltage applied to the control electrodes E and O, thereby acts as an intensity modulation, and preferably has a high degree of modulation, for example 100%, of the light that proceeds via the input/output AI of the strip waveguide SL back into the light waveguide LWL where it is then transmitted in the return direction to the other end of the light waveguide communications system. Dependent on the momentary value of the transmission signal, the light in one limiting case, given constructive interference, can thereby be transmitted back via the light waveguide LWL at a maximum intensity, and in another limiting case given a destructive interference, a complete cancelling of this light can occur. In general, namely given a momentary value of the transmission signal that lies between the limit values, one will lie between the described limit cases.

Given a loss-free resonator, reflection maximums or, respectively, transmission maximums, that are all the more sharply pronounced, the greater the reflectivity of the mirror employed derive given variations of the optical pathlength between the mirrors SI and SII. An optimum modulation boost derives in this case given the highest possible reflectivity of the mirrored end faces (R approximately 100%).

Due to the propagation losses of the light wave in the Ti:LiNbO$_3$ waveguide ($\alpha \approx 0.2$ dB cm$^{-1}$) and, due to diffusion losses at the mirrored end faces SI and SII, the resonator is not loss-free in practice. Given an estimated overall loss of about 15% per facet, this results in a maximum modulation boost given a reflectivity of about 40%.

In order to achieve independence from the polarization direction of the light incoming via the light waveguide LWL, a specific section of the LiNbO$_3$ crystal, for which the electro-optical coefficients are the same for TE modes and TM modes can be used for a LiNbO$_3$ substrate. The strip waveguide SL is formed in this section by diffusion of titanium into the substrate.

A preferred exemplary embodiment of the integrated optical reflection transmission-reception module of the invention has the following features:
 a structural length of about 15 mm,
 overall loss of about 15% per facet,
 crystal section along the crystallographic X-axis,
 waveguide along the crystallographic Y-axis,
 reflectivity of the mirroring surfaces about 40%,
 transmission signal voltage $U_{St} \leq 3$ V,
 transmission of optical power is 10–56%, and
 reflective optical power is 0–46%, (both of the optical power coupled in and dependent on the transmission signal voltage that is applied).

The operating point of the reflection transmitter module can be set by underlying the transmission signal voltage with a dc voltage. Since the amplitude modulation of the light reflected to the light waveguide LWL that is produced by the transmission signal voltage is also reflected in the optical signal transmitted to the opto-electric transducer o/e, a part of the signal received at the subscriber can be used in order to stabilize the FPR module in the optimum operating point via a control circuit. Insofar as the FPR module is exposed to pronounce temperature fluctuations, a combined thermic and electric control can also stabilize the operating points for the module. The electronic control can therefore compensate fast disturbances and the thermic control can compensate long-term drifts with the Peltier element.

For bidirectional data transmission via one fiber, the data rates for the two transmission directions should noticeably differ from one another so that the existing cross-talk between a forward channel and a return channel can be eliminated with electronic filtering.

This prerequisite is established, for example, in a subscriber terminal of a broadband ISDN (with distributing services): wherein a laser transmitter in the exchange sends a 680 Mbaud signal having a modulation degree of 10% via monomode light waveguide LWL through the Fabry-Perot resonator FPR to the optical receiver element o/e of the subscriber. Dependent on the subscriber transmission signal voltage applied to the Fabry-Perot resonator FPR, between 10% and 56% of the power coupled into the Fabry-Perot resonator FPR proceeds to the opto-electrical transducer o/e of the subscriber. For transmitting data from the subscriber to the exchange, the Fabry-Peror resonator is switched back and forth between its reflecting and transmitting condition or mode so that the light reflected back to the exchange carries a data rate of 140 Mbaud having a modulation degree of about 100% on which the optical signal (preferably having a low degree of modulation) received from the cooperating side of the light waveguide communications system is superimposed as a slight, high-frequency disturbance.

Although various minor modifications may be suggested by those versed in the art, it should be understood that I wish to embody within the scope of the patent granted hereon all such modifications as reasonably and properly come within the scope of my contribution to the art.

I claim:

1. In a reflection transmitter and receiver means for a bidirectional light waveguide communications system comprising a light waveguide having a first and second end, a light source preferably formed by a laser at only the first end of said light waveguide, and an electro-optical transducer being coupled to the second end to receive light leaving said second end, the improvement comprising an electrically controllable integrated-optical Fabry-Perot resonator having first and second partially reflecting mirrors and control electrodes, said resonator being connected to the second end of the waveguide with the first partially reflecting mirror forming an input/output for the waveguide, said electrodes being connected to a transmission signal source and said transducer being positioned to receive light passing through the second partial reflective mirror.

2. In a reflection transmitter and receiver means according to claim 1, wherein the electrically controllable integrated optical Fabry-Perot resonator is formed by a linear strip waveguide diffused into a lithium niobate substrate, said substrate having partially reflective, mirrored end faces forming the first and second partially reflective mirrors, and control electrodes arranged on the substrate to extend parallel to said strip waveguide.

3. In a bidirectional light waveguide communications system comprising a light source connected to only one end of a light waveguide, another end of the light waveguide being connected to a reflection transmitter and receiver means followed by an opto-electric transducer for a subscriber, the improvements comprising said reflection transmitter and receiver means being an electrically controllable integrated optical Fabry-Perot resonator having a first partially reflecting mirror being connected to the light waveguide and a second partially reflecting mirror being positioned adjacent the opto-electric transducer, said resonator having control electrodes connected to a transmission signal source to vary said resonator between a transmitting and reflecting mode.

4. In a bidirectional light communications system according to claim 3, wherein the electrically controllable integrated optical Fabry-Perot resonator is formed by a linear strip waveguide diffused into a lithium niobate substrate, said substrate having partially reflecting end faces forming the first and second partially reflecting mirrors and the control electrodes extending on the substrate parallel to the strip waveguide and adjacent thereto.

* * * * *